United States Patent
Brännström et al.

(10) Patent No.: US 9,294,220 B2
(45) Date of Patent: Mar. 22, 2016

(54) ADJUSTING CHANNEL QUALITY REPORT IN A WIRELESS COMMUNICATION NETWORK

(75) Inventors: Nils Brännström, Stockholm (SE); Stephen Craig, Nacka (SE); Anders Jonsson, Täby (SE); Kjell Larsson, Luleå (SE); Peter Ökvist, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1106 days.

(21) Appl. No.: 13/380,412

(22) PCT Filed: Jul. 1, 2009

(86) PCT No.: PCT/EP2009/058244
§ 371 (c)(1),
(2), (4) Date: Dec. 22, 2011

(87) PCT Pub. No.: WO2011/000420
PCT Pub. Date: Jan. 6, 2011

(65) Prior Publication Data
US 2012/0099471 A1    Apr. 26, 2012

(51) Int. Cl.
*H04L 1/00*    (2006.01)
*H04L 1/20*    (2006.01)
(Continued)

(52) U.S. Cl.
CPC ............ *H04L 1/0026* (2013.01); *H04B 17/309* (2015.01); *H04B 7/0632* (2013.01); *H04B 17/24* (2015.01); *H04L 1/0033* (2013.01); *H04L 1/20* (2013.01)

(58) Field of Classification Search
CPC ............. H04B 7/0632; H04B 17/0042; H04B 17/0067; H04B 17/309; H04B 17/24; H04L 1/0026; H04L 1/0033; H04L 1/20; H04L 12/66
See application file for complete search history.

(56) References Cited

U.S. PATENT DOCUMENTS 7,171,229 B2 * 1/2007 Moulsley .............. H04L 1/0026
                                                              455/226.3
7,321,636 B2 * 1/2008 Harel et al. .................... 375/299
(Continued)

FOREIGN PATENT DOCUMENTS

EP       1592139 A2    11/2005
WO    2006/075208 A1    7/2006
WO    2008/143566 A1   11/2008

OTHER PUBLICATIONS

Martin-Sacristan, D. et al. "HSDPA Link Adaptation Improvement Based on Node-B CQI Processing." 4th International Symposium on Wireless Communication Systems, Trondheim, Norway, Oct. 17-19, 2007.
(Continued)

*Primary Examiner* — Parth Patel
*Assistant Examiner* — Kai Chang
(74) *Attorney, Agent, or Firm* — Coats & Bennett, PLLC.

(57) ABSTRACT

The present invention relates to a method and an arrangement in a first communication node for adjusting a channel quality report transmitted between the first communication node and a second communication node. The first communication node and the second communication node are comprised in a wireless communication network, and are adapted to communicate with each other via a radio link. In a first step, a channel quality report is received from the second communication node. The channel quality report is established by the second communication node. Then at least one channel characteristic parameter is obtained. The next step is to determine a channel quality offset based on the obtained channel characteristic parameter. Based on the channel quality offset, the channel quality report is adjusted.

16 Claims, 7 Drawing Sheets (51) Int. Cl.
*H04B 17/309* (2015.01)
*H04B 17/24* (2015.01)
*H04B 7/06* (2006.01)

(56) References Cited

U.S. PATENT DOCUMENTS

| | | | |
|---|---|---|---|
| 2004/0014443 A1* | 1/2004 | Nakao et al. | 455/130 |
| 2004/0137948 A1* | 7/2004 | Benning et al. | 455/562.1 |
| 2004/0213365 A1* | 10/2004 | Murakami et al. | 375/347 |
| 2004/0266360 A1* | 12/2004 | Hamalainen et al. | 455/67.16 |
| 2005/0185733 A1* | 8/2005 | Tolli | H04L 1/0025 375/285 |
| 2005/0201474 A1* | 9/2005 | Cho et al. | 375/260 |
| 2007/0077956 A1* | 4/2007 | Julian | H04W 52/146 455/522 |
| 2008/0057969 A1* | 3/2008 | Agami et al. | 455/450 |
| 2008/0130790 A1* | 6/2008 | Forenza et al. | 375/299 |
| 2008/0132281 A1* | 6/2008 | Kim et al. | 455/562.1 |
| 2008/0240216 A1* | 10/2008 | Kolding et al. | 375/227 |
| 2009/0067329 A1* | 3/2009 | Sumasu | H04W 72/085 370/232 |
| 2009/0109907 A1* | 4/2009 | Tsai et al. | 370/329 |
| 2009/0163142 A1* | 6/2009 | Pi et al. | 455/62 |
| 2010/0067396 A1* | 3/2010 | Cui et al. | 370/252 |
| 2010/0296553 A1* | 11/2010 | Luschi et al. | 375/148 |
| 2011/0141926 A1* | 6/2011 | Damnjanovic | H04L 1/0026 370/252 |
| 2011/0158305 A1* | 6/2011 | Goransson | H04J 11/004 375/227 |
| 2012/0309334 A1* | 12/2012 | Raza | H04B 17/336 455/161.3 |

OTHER PUBLICATIONS

Muller, A. et al. "Improving HSDPA Link Adaptation by Considering the Age of Channel Quality Feedback Information." 2005 IEEE 62nd Vehicular Technology Conference, vol. 3, Sep. 25-28, 2005.

* cited by examiner

ADJUSTING CHANNEL QUALITY REPORT IN A WIRELESS COMMUNICATION NETWORK

TECHNICAL FIELD

This invention generally relates to a method and an arrangement in a first communication node. More specifically, it relates to adjusting a channel quality report transmitted between the first communication node and a second communication node.

BACKGROUND

In wireless communication systems the method of adjusting transmission parameters such as modulation type, transport block size and transmission power to the current radio channel quality, is commonly referred to as link adaptation. The link adaptation is a dynamic process and serves to adapt to varying radio channel quality in order to optimize the use of transmission resources. Typically, the transmission parameters are adjusted to maintain a targeted Block Error Rate (BLER) while maximizing the data rate over the air interface. Channel-dependent scheduling of shared resources amongst users is also an important concept in many wireless communication systems to achieve as efficient resource utilization as possible. This type of scheduling strategy takes instantaneous channel quality conditions into account when allocating shared resources.

To enable link adaptation and channel-dependent scheduling, channel quality feedback is required from a receiving node, e.g. a user equipment (UE). For example, in a Wideband Code Division Multiple Access (WCDMA) system employing High-Speed Downlink Packet Access (HSDPA), fast link adaptation and scheduling of packet data may be performed on a 2 ms basis. The user equipment performs quality measurements on a Common Pilot Channel (CPICH) and derives a channel quality report, in form of a Channel Quality Indicator (CQI) value. The CQI value is reported back to the base station, for example a NodeB, and may be translated to a Signal-to-Interference Ratio (SIR) measured by the user equipment.

The CQI values may be transmitted on the High-Speed Dedicated Physical Control Channel (HS-DPCCH) in different ways. One way is to transmit the CQI values with a fixed configurable periodicity. Another possible way is to transmit the values according to uplink Dedicated Physical Control Channel (DPCCH) burst patterns during traffic inactivity if uplink discontinuous transmission from the Continuous Packet Connectivity (CPC) feature package is employed.

In general, the more frequently channel quality reports are fed back to the transmitting node, e.g. the base station,—the better knowledge that node will have of the varying channel quality experienced by the receiving node. This increases the probability of good link adaptation and also system performance when the quality reports are used to assist channel-dependent scheduling. The drawback of this is that, the reports must be signaled on the reverse link which will generate more information overhead the more frequently they are sent.

Due to delays from the time the receiving node measures the channel quality until data is scheduled for transmission to the receiving node, the experienced channel quality at the receiving node may change significantly due to e.g. fast channel fading. The experienced channel quality at transmission may be better or worse than what was reported to the transmitting node. Taking HSDPA as an example, the delay may range from approximately 7 ms up to 160 ms and may be built up of specified physical channel timing, network processing delay and delay from the time the last CQI value was fed back to the transmitting node. Consequently there is a risk of underestimating or overestimating the actual channel quality.

A known CQI adjustment strategy where a parameter $CQI_{used}$ is adjusted targeting a certain long-term BLER level is as follows:

$$CQI_{used} = CQI + CQI_\Delta \quad (1)$$

where $CQI_\Delta$ is an adaptive adjustment based on BLER measurements. Hence, $CQI_{used}$ may not be the same as the received CQI reported from the user equipment.

Using some kind of CQI adjustment strategy, for example an outer-loop adjustment, this should be able to handle channel variation as long as the corresponding changes are not too rapid. Typically, with low enough speed and/or an uncomplicated radio channel it will not be any problems. The CQI reporting delay may also impact accuracy.

Nevertheless, both mobile speed and propagation environment may change faster than a strategy based on BLER measurements can cope with, especially in cases with high mobile speed in a rapidly fading environment. This means that at the time of HS-DSCH transmission, the latest received CQI may be outdated.

WO 2006/075208 discloses a mechanism that applies a back-off value to the reported channel quality aiming to avoid overestimation of the real channel quality depending on the time elapsed since the quality report was received. The back-off values provides adjustments in only one direction, i.e. downwards. WO 2008/143566 addresses the facts of under- and overestimation by applying an offset value to the reported channel quality as a function of the deviation from an expected quality report value which has been generated from filtering out fast quality report variations. Both these documents use fix parameters for adjustments.

U.S. Pat. No. 7,304,939 disclose techniques for using orthogonal signals in both uplink and downlink so that simultaneous transmission in downlink and uplink in the very same frequency band can be accomplished.

A problem with existing solutions for link adaptation for downlink HSDPA is that when a specific CQI value is to be used it might be outdated due e.g. to time characteristics or variations of the radio channel in combination with the CQI reporting delay. More specifically, due to the delay, fast fading peaks and dips that have been tracked by the user equipments CPICH-measurements, may not be present at HS-DSCH transmission since channel coherence time is shorter than the total CQI delay at data transmission. Coherence time should be considered as the time over which a propagating wave could be seen as "coherent"; the time during which the phase, in average, is more or less predictable.

From this follows that the CQI estimate at time of use may be less accurate resulting in unnecessarily high BLER. Experienced channel quality may often be lower when the channel quality estimate is based on a "peak CQI" and often higher when based on a "dip CQI", which may cause a deviation from the targeted BLER resulting in lower throughput.

If the transmission parameters are chosen based on an unreliable reported channel quality with respect to the channel coherence time, the consequences may either be underutilization, resulting in the selection of a smaller transport block than necessary, or overestimation causing block errors and thereby an inefficient use of transmission resources.

Another shortcoming of the known techniques is that the validity of the channel quality report depends on its actual age in relation to the present channel coherence time, i.e., the time it takes until the channel is uncorrelated from a point in time. If the coherence time of the channel is much longer than the total age of the quality report, the reported channel quality is statistically reliable regardless of the trend of previous quality reports. If on the other hand the communication channel is subject to large Doppler spread, equivalent to a short channel coherence time, the actual reported channel quality may be statistically uncorrelated with the experienced quality during data transmission.

Key features in evolved High Speed Packet Access (HSPA) such as CPC and uplink interference cancellation techniques may cause additional and varying channel quality reporting delays. At the same time, individual radio links may be subject to different degrees of Doppler spread. The importance may also scale with the WCDMA multi-carrier evolution, where channel qualities are reported for multiple individual carriers and channel-dependent scheduling of packet data may be done over frequencies simultaneously.

SUMMARY

It is thus an object of the present invention to provide an improved method for adjustment of a channel quality report.

According to a first aspect of the invention, the objective is achieved by a method in a first communication node for adjusting a channel quality report transmitted between the first communication node and a second communication node. The first communication node and the second communication node are comprised in a wireless communication network, and they are adapted to communicate with each other via a radio link. First, the first communication node receives a channel quality report from the second communication node. The channel quality report is established by the second communication node. Then, at least one channel characteristic parameter is obtained. The next step is to determine a channel quality offset based on the obtained channel characteristic parameter. Then, the channel quality report is adjusted based on the channel quality offset.

In a second aspect of the present solution, there is provided an arrangement in a first communication node for adjusting a channel quality report transmitted between the first communication node and a second communication node. The first communication node and second communication node are comprised in a wireless communication network, and they are adapted to communicate with each other via a radio link. The first communication node comprises a receiving unit which is arranged to receive a channel quality report from the second communication node. The channel quality report is established by the second communication node. The first communication node also comprises an obtaining unit which is arranged to obtain at least one channel characteristic parameter, and a determining unit arranged to determine a channel quality offset based on the obtained channel characteristic parameter. In addition, the first communication node comprises an adjusting unit arranged to adjust the channel quality report based on the channel quality offset.

Thanks to the adjustable offset, an improved method for adjusting a channel quality report is achieved. This improved method is a mechanism that, depending on mobile speed and propagation environment, may adjust the offset used in e.g. the link adaptation process or the process of channel-dependent scheduling.

The disclosed solution improves the accuracy of a reported channel quality by judging its reliability in respect to its age and the channel coherence time. The dynamically adjusted channel quality report may serve as an enhanced input for e.g. link adaptation and channel-dependent scheduling decisions which provides considerable performance gains.

The invention may also provide robustness to increasing delays and variance of channel quality feedback introduced by evolved HSPA features. The improved accuracy may also be beneficial in order to exploit scheduling gains over frequencies better where data transmission is possible over multiple carriers simultaneously.

The invention may be implemented with little complexity and may also operate independently of more long-term adjustments of channel quality reports. In fact, such parallel algorithms should only benefit from the improved accuracy at each transmission instant.

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail in the following detailed description by reference to the appended drawings illustrating embodiments of the invention and in which.

DETAILED DESCRIPTION

The basic idea of the invention is to use an adjustable offset in a process of adjusting a channel quality report based on information about the radio propagation environment. The channel quality report may be a Channel Quality Indicator (CQI) value. The offset adjustment may be a function of e.g. mobile speed and typical channel characteristics. Such characteristics may be how rapid changes in propagation environment are, since this affects how much the channel might change between the "reported" CQI and "used" CQI. More specifically, the solution intends to tie the degree of adjustment to the channel coherence time and CQI age.

The present solution relates to an improved solution for a mechanism for adjustment of a channel quality report where an offset is adapted, i.e. an inner loop, based on radio channel characteristic parameters, such as e.g. Doppler spread, Root Means Square (RMS) delay spread, channel tap correlation, channel coherence time, number of channel taps or channel impulse response. The solution is applicable to wireless systems using quality feedback information to perform adjustment of channel quality in systems using technologies such as e.g. Wideband Code Division Multiple Access (WCDMA), Long Term Evolution (LTE), etc. The adjustment of a channel quality report may be used in for example link adaptation or channel-dependent scheduling amongst users. A person skilled in the art will understand that the present solution may be used in other applications in addition to the ones that are mentioned.

Figure 1:
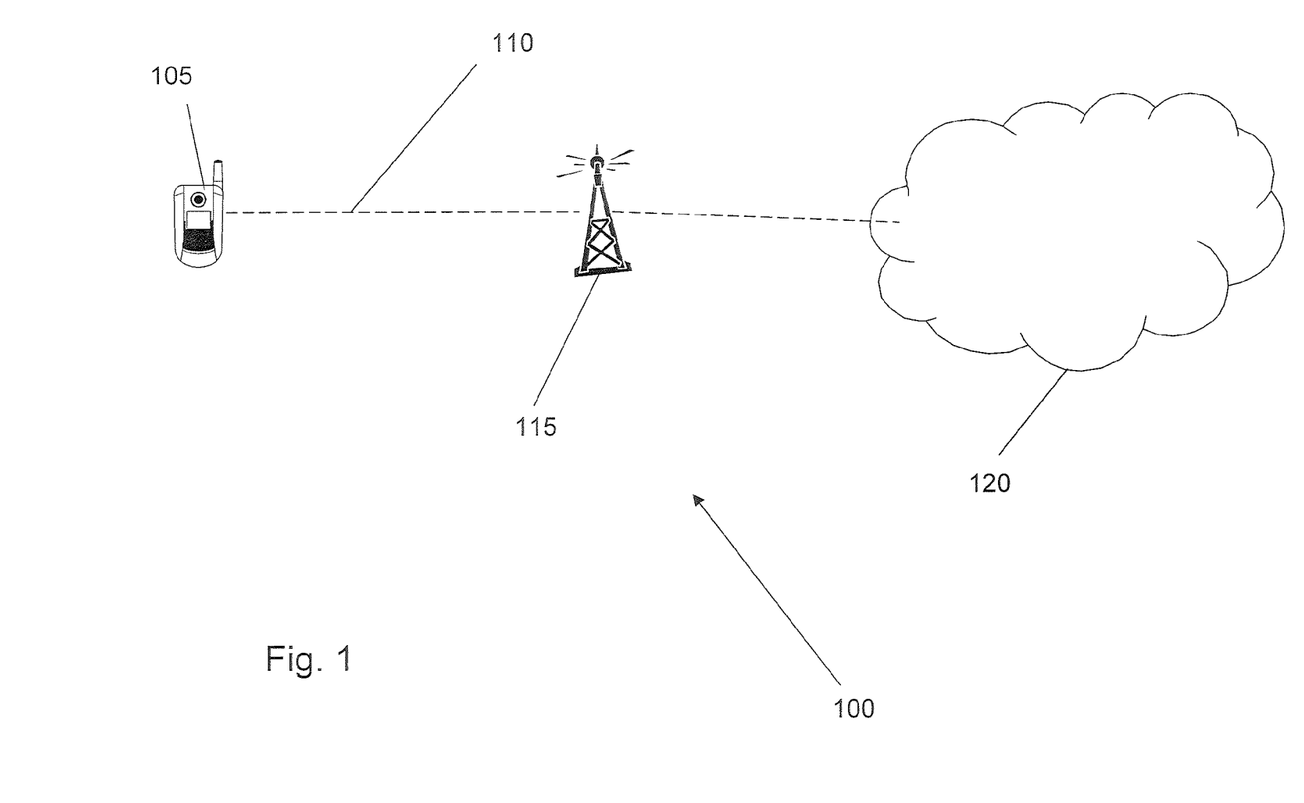
FIG. 1 is a schematic block diagram illustrating a wireless communication network.

FIG. 1 is a schematic block diagram illustrating wireless communication network 100 using channel quality feedback information to perform adjustment of a channel quality report. The system may use technologies such as e.g. WCDMA, LTE etc. The network 100 comprises a first communication node 115 and a second communication node 105. The first communication node 115 may be e.g. a base station, NodeB, eNodeB, etc. The second communication node 105 may be any suitable communication device or computational device with communication capabilities, for instance but not limited to user equipment, mobile phone, personal digital assistant (FDA), laptop, MP3 player or portable DVD player (or similar media content devices), digital camera, or even stationary devices such as a PC. In other embodiments, the first communication node 115 may be any suitable communication device or computational device with communication capabilities and the second communication node 105 may be e.g. a base station, NodeB, eNodeB, etc. A radio link 110 is arranged between the first communication node 115 and the second communication node 105 providing a radio interface between the nodes. The first communication node 115 and the second communication node 105 communicates with each other using any suitable kind of wireless communication link. The communication link may use any suitable protocol depending on type and level of layer, e.g. as indicated by the OSI model, as understood by the person skilled in the art.

The first communication node 115 may be connected to a core network 120 providing e.g. internet services to the second communication node 105. Other, not shown, nodes or devices, such as e.g. other base stations, routers, may be comprised in the wireless communication network 100.

Figure 2:
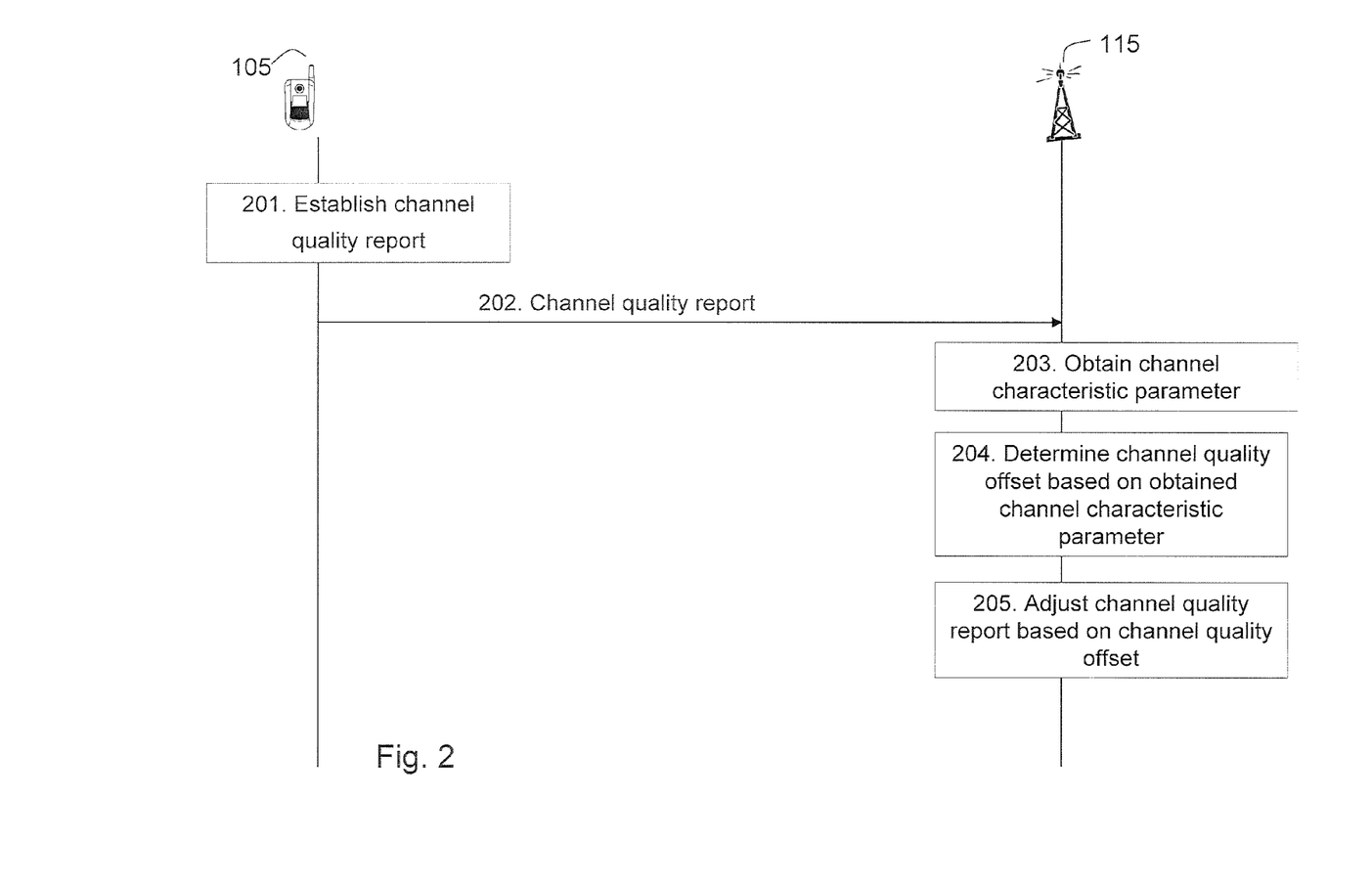
FIG. 2 is a combined schematic block diagram and flowchart depicting embodiments of a method.

The present solution method for adjusting a channel quality report transmitted between the first communication node 115 and a second communication node 105 according to some embodiments will now be described with reference to the combined signalling diagram and flowchart depicted in FIG. 2. The method comprises the following steps, which steps may as well be carried out in another suitable order than described below:

Step 201

The second communication node 105 establishes a channel quality report. The channel quality report may be a Channel Quality Indicator value reflecting rapid changes in the radio propagation environment.

Step 202

The second communication node 105 sends the channel quality report to the first communication node 115.

Step 203

The first communication node 115 obtains at least one channel characteristic parameter.

Information on radio channel characteristic parameters, i.e. Doppler spread, channel coherence time, how many channel taps that are present and their corresponding delay may be achieved by measuring the Root-Mean-Square (RMS) delay spread and channel impulse response. Doppler spread may be an example of how fast the channel varies. Doppler spectrum, channel coherence time, RMS delay spread, channel tap correlation, number of channel taps, channel impulse response, etc. are examples of channel characteristic parameters that the first communication node 115 may obtain.

There may be two alternative implementations for derivation of the necessary channel characteristic parameters; in the first communication node 115 or in the second communication node 105.

Step 204

The first communication node 115 determines a channel quality offset based on the obtained channel characteristic parameter. The channel quality offset, i.e. the correction term, can be described as $\Phi(d_1, d_2, \ldots, d_n)$, where $\Phi(\ldots)$ represents the offset and $d_i$ denotes the channel characteristic parameters, for example channel coherence time, Doppler spectrum, RMS delay spread, channel tap correlation, number of channel taps, channel impulse response, etc. The offset $\Phi(\ldots)$ may be used to adjust the reported channel quality. In derivation of the offset $\Phi(\ldots)$ it is important to realize that the relation between a channel coherence time, $T_c$, and a CQI age is key information about the channel quality estimate validity.

The offset $\Phi(\ldots)$ may be expressed as a received quality adjustment factor, $CQI_{offset}$, which may be expressed as a function of deviation from "expected CQI", $CQI_{dev}$, the age of the CQI value, i.e. the CQI delay, $T_{CQI_{rx}}$, and the channel coherence time, as $CQI_{offset} = f(CQI_{dev}, T_{CQI_{rx}}, T_c)$. Having the quality measure described as above enables adaptation to what degree the instantaneous CQI should be trusted as it varies with the channel Doppler spread and the $T_{CQI_{rx}}$ within a fixed or varying periodicity of CQI feedback.

The quality measure adjustment may be written as a composite function, according to:

$$CQI_{offset} = \underbrace{f(T_{CQI_{rx}}, T_c)}_{\substack{Compensation \\ factor/Weight\ function}} \cdot \underbrace{CQI_{dev}}_{\substack{Deviation\ from \\ expected\ CQI(+/-)}} \quad (2)$$

Or in more general terms:

$$CQI_{offset} = f(x) \cdot g(y) \quad (3)$$

where $f(x)$ is the weight function and $g(y)$ relates to incoming CQI reports, i.e. it is a channel quality report parameter.

Figure 3:
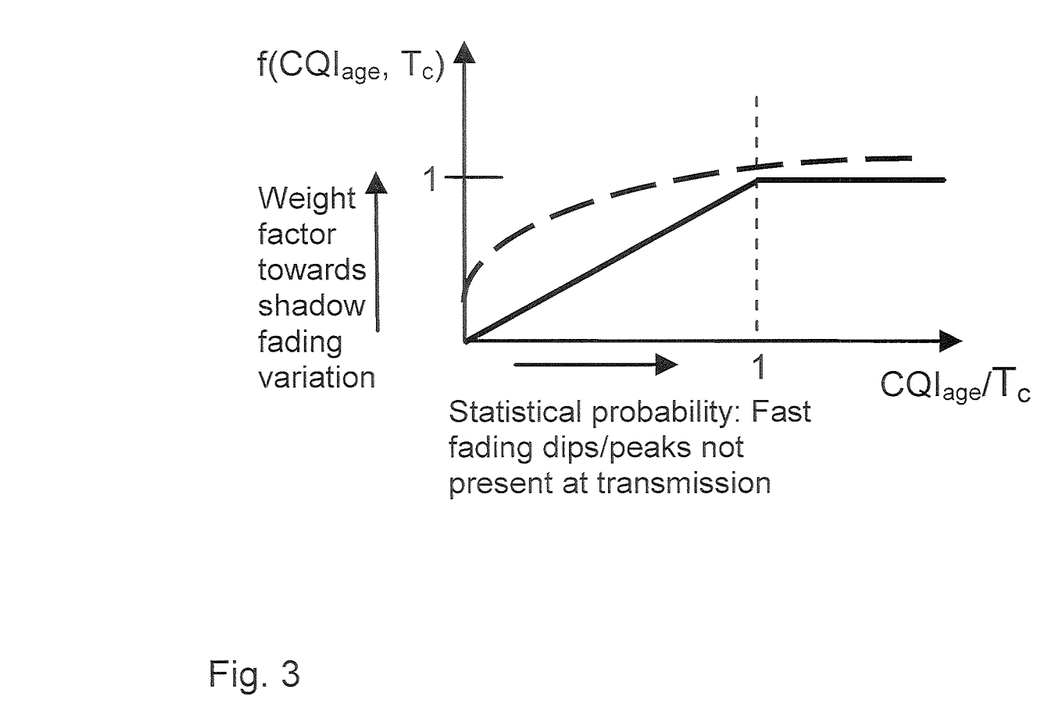
FIG. 3 is a graph illustrating the relation between compensation factor and CQI age over coherence time.

Various functions may be used to calculate the compensation factor/weight function, for example:

$$f(T_{CQI_{rx}}, T_c) = 1 - \frac{1}{e^{\frac{T_{CQI_{rx}} + C}{T_c}}} \quad (4)$$

where the constant C may account for the time in the second communication node 105 during which the CQI is generated. The weight function will be described in more detail later. The behavior of equation 4, i.e. the relation between compensation factor and $T_{CQI_{rx}}$ over coherence time, is further depicted in FIG. 3, where the solid line illustrates equation 6 below and the dotted line illustrates equation 4.

The coherence time may be estimated using Doppler frequency estimation in the first communication node 115. More long-term adjustment based on only Hybrid Automatic Repeat Request (HARQ) feedback may still operate in parallel.

In one exemplary control algorithm, derived from the general algorithm in equation 3, the latest received CQI, $CQI_{rx}$, from the first communication node 115 is adjusted by a channel quality offset, $CQI_{offset}$, at each transmission instant which is calculated in the following way:

$$CQI_{offset} = f(T_{CQI_{rx}}, T_c) \cdot (CQI_{filt} - CQI_{rx}) \quad (5)$$

where $CQI_{filt}$ is the output from low-pass filtering the preceding reported CQI values. The difference between $CQI_{filt}$ and $CQI_{rx}$ is multiplied with a weighting function, $f(T_{CQI_{rx}}, T_c)$, which will be described further in detail below. The weighting function is chosen so that it will always have positive values and increase as the ratio of the total age of the received CQI report, $T_{CQI_{rx}}$, to an estimated channel coherence time, $T_c$, increases.

By this principle, the reported CQI will achieve a larger compensation as the age of the reported CQI becomes closer or exceeds the channel coherence time. This may be viewed as the reported CQI becoming more and more unreliable. If this fraction is small, the correlation between the reported channel quality and the actual channel quality is high, which means that little or no compensation may be done to the reported CQI. The sign of the offset is determined by the difference between $CQI_{filt}$ and $CQI_{rx}$.

Consequently, the channel quality offset to reported CQI will be positive if the reported CQI is lower than the value from low-pass filtering the preceding CQIs and vice versa.

As mentioned above, a weighting function is a part of the calculation of the $CQI_{offset}$. The weighting function $f(T_{CQI_{rx}}, T_c)$ may have different compositions.

In one embodiment, the weighting function may be as follows:

$$f(T_{CQI_{rx}}, T_c) = \begin{cases} \frac{T_{CQI_{rx}}}{T_c}, & T_{CQI_{rx}} < T_c \\ 1, & T_{CQI_{rx}} \geq T_c \end{cases} \quad (6)$$

where $T_{CQI_{rx}}$ is the total age of the received CQI report and $T_c$ is an estimated channel coherence time.

The degree of adjustment equals to the ratio of total CQI delay to the estimated coherence time. If the age of the CQI report exceeds the coherence time, the out-dated CQI report may be adjusted fully to the maintained low-pass filtered value, by setting the weight equal to one.

In another alternative embodiment, a smoother nonlinear function may decide the weight value, as shown in equation 4 previously.

The total age of the reported CQI, $T_{CQI_{rx}}$, may also incorporate a constant delay in addition to the variable delay from CQI reception until the transmission instant. This fixed delay may capture an average time spent for channel quality measurements in the terminal. From 3GPP Release 8 the second communication nodes 105 may for example be restricted to perform quality measurements or filtering no longer than equivalent to nine slots simple averaging.

In another alternative embodiment, the weight function may also be dependent on the absolute level of the filtered CQI. Preferably its derivative may increase with larger reported CQI values. In this way the adjustment may be more aggressive the larger transport block size the first communication node 115 recommends to compensate for increasing channel-coding rates, and thus sensitivity to channel quality estimation errors.

This weight function may be as follows, where the derivative may depend on the present value of the filtered CQI, $CQI_{filt}$:

$$f(T_{CQI_{rx}}, T_c, CQI_{filt}) = \begin{cases} \left(1 + \frac{CQI_{filt}}{30}\right) \cdot \frac{T_{CQI_{rx}}}{T_c}, & T_{CQI_{rx}} < T_c \\ 1 + \frac{CQI_{filt}}{30}, & T_{CQI_{rx}} \geq T_c \end{cases} \quad (7)$$

where $T_{CQI_{rx}}$ is the total age of the received CQI report, $T_c$ is an estimated channel coherence time, and $CQI_{filt}$ is the filtered CQI value.

The function's derivative may also directly be dependent on the channel-coding rate, codeRate, itself as exemplified below:

$$f(T_{CQI_{rx}}, T_c, codeRate) = \begin{cases} (2 \cdot codeRate) \cdot \frac{T_{CQI_{rx}}}{T_c}, & T_{CQI_{rx}} < T_c \\ 2 \cdot codeRate, & T_{CQI_{rx}} \geq T_c \end{cases} \quad (8)$$

To determine the coherence time of the channel, the present solution may use different channel characteristic parameters. One parameter that may be used is a measured Doppler spread on the reverse link which is assumed to be readily available.

Coherence time is considered as the time over which a propagating wave could be seen as "coherent", i.e. the time during which the phase, in average, is more or less predictable.

Figure 4:
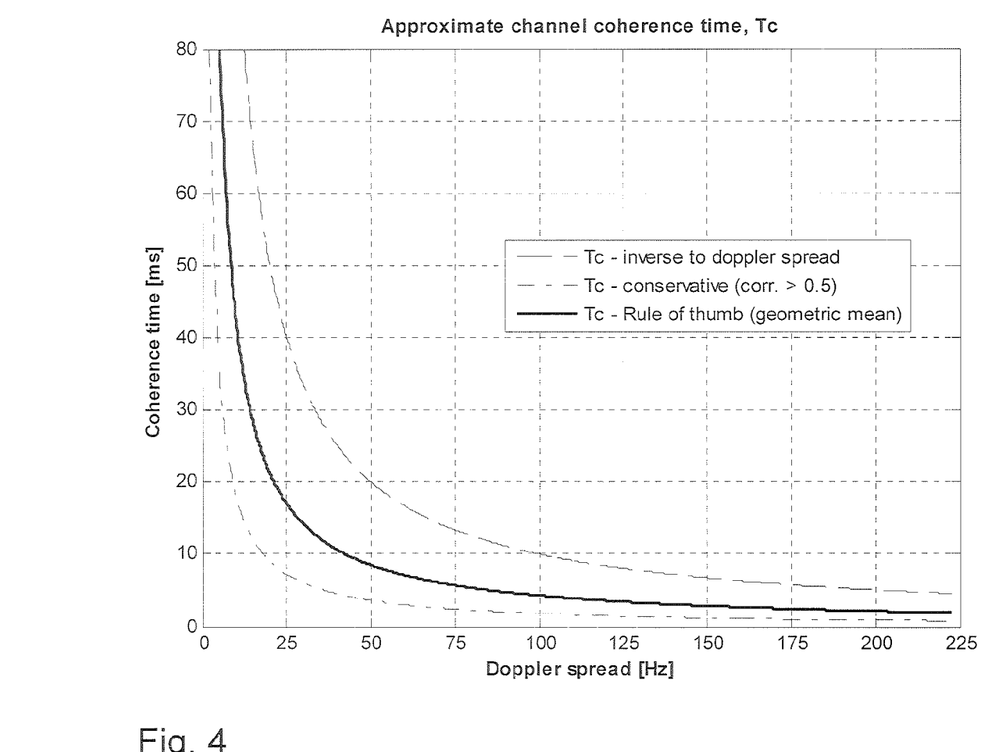
FIG. 4 is a graph showing the coherence time as a function of Doppler spread.

In literature, a popular rule of thumb is the following expression, $$T_c = \sqrt{\frac{9}{16 \cdot \pi \cdot f_d^2}} \quad (9)$$

where $f_d$ is the Doppler spread. This expression is the geometric mean over the inverse to the Doppler spread and the time correlation being equal or greater than 0.5. FIG. 4 shows the coherence time as a function of Doppler spread using the mentioned expressions.

A simple mapping table from Doppler spread to coherence time may also be used rather than an analytical expression if the Doppler spread measurements are available with a certain resolution or accuracy.

In order to track the slowly changing trend of the reported CQIs, the received CQI reports needs to be low-pass filtered. The results, $CQI_{filt}$, should filter out the fast variations due to fast channel fading. The filter type may be any type of low-pass filter operating on a time frame in the order of 100-300 ms. In a preferred embodiment, an exponential moving average filter is used, which is cheap from a data storage point-of-view:

$$CQI_{filt}(k) = \alpha \cdot CQI_{rx}(k) + (1-\alpha) \cdot CQI_{filt}(k-1) \quad (10)$$

Here, k denotes a time index when a new CQI report is received and the filter constant, $\alpha$, is to filter out the fast fading variations.

Figure 5:
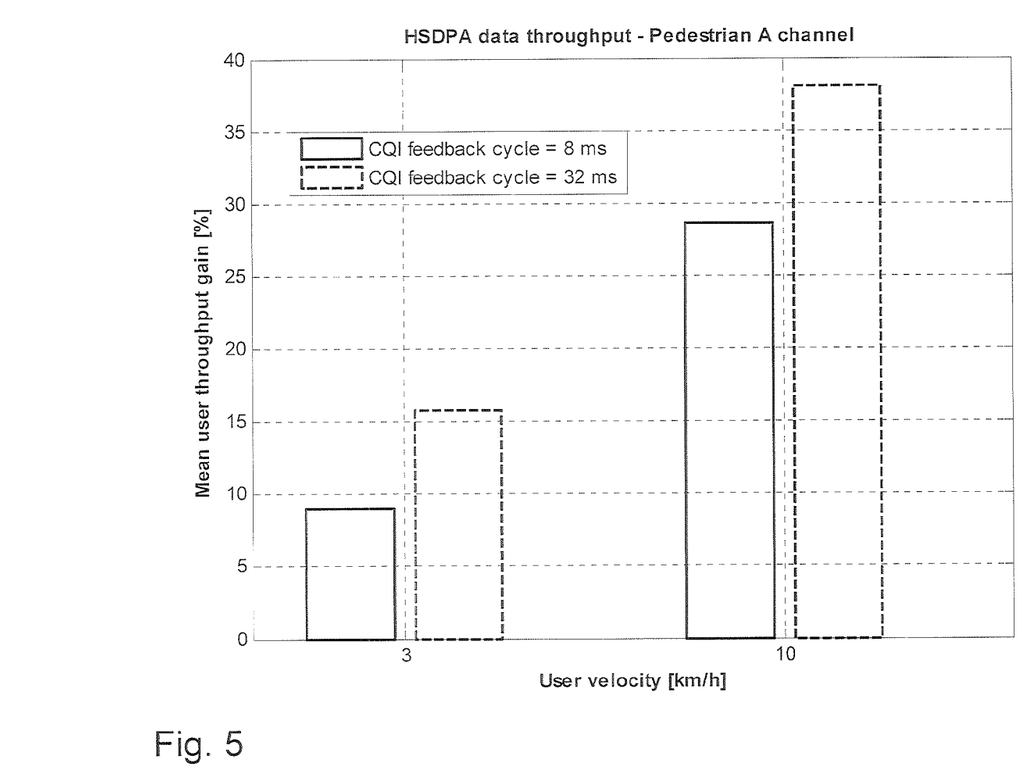
FIG. 5 is a bar diagram showing an example of the performance gains, obtained through system simulations.

FIG. 5 shows an example of the performance gains, obtained through system simulations, using the weight function in equation 7 and a filter constant $\alpha$. The mean user throughput gains are displayed for a user velocity of 3 km/h and 10 km/h. Clearly, the throughput performance is improved and especially for the cases with longer CQI feedback cycles of 32 ms for the two different user velocities. The age of the reported CQI may grow up to ~37 ms assuming this fixed periodicity of CQI reports.

The improvement is also greater for a user velocity of 10 km/h compared to 3 km/h, reaching a throughput gain of 38%. Since the channel coherence time is significantly shorter in the 10 km/h scenario, the dynamic CQI report handling needs to adjust the reported CQIs to a larger extent, which proves to be beneficial compared to the reference case using no such handling.

Referring again to FIG. 2:

Step 205

The first communication node 115 adjusts the channel quality report based on the channel quality offset.

In HSDPA, a straightforward add-on may be to apply the offset to the reported Channel Quality Indicator (CQI) value reflecting rapid changes in the propagation environment, according to:

$$CQI_{used} = CQI + CQI_{\Delta} \ldots + \ldots \pm \Phi(d_1, d_2, \ldots, d_n) \quad (11)$$

where $CQI_{\Delta}$ is an adaptive adjustment based on BLER measurements and $\Phi(\ldots)$ represents the offset and $d_i$ denotes for example Doppler spread, channel coherence time, RMS delay spread, channel tap correlation, number of channel taps, channel impulse response, etc.

In some embodiments, step 201 may be comprised in the second communication node 105 and steps 202-205 may be comprised the first communication node 115. It is assumed that the propagation environment is invariant so that the downlink channel may be properly depicted by uplink channel characteristics measurements performed in the first communication node 115. In some embodiments, the second communication node 105 may estimate the downlink radio characteristics and signals that up to the first communication node 115.

In some embodiments, step 201 may be comprised in the first communication node 115 and the steps 202-205 may be comprised in the second communication node 105 which may have the benefit of accurate information on the downlink channel. Information on the downlink channel may easily be measured in the second communication node 105, but it might be difficult to know how and if the first communication node 115 handles an "improved" reported channel quality, since both nodes cannot try to combat the same problem.

In an embodiment of the present solution, Doppler spread information may be used to adjust a reported channel quality in order to improve the accuracy of the reported channel quality. The reported channel quality may be adjusted upwards or downwards to a degree depending on an estimated coherence time of the channel, which may be calculated from Doppler spread measurements in the transmitting node, and on the total age of the channel quality report at each transmission instant. The channel quality report may be adjusted upwards or downwards towards an output from low-pass filtering the preceding reported channel qualities. By taking the quantities mentioned above into account, it may enable a concept to judge the need for adjusting the reported channel quality to a certain degree and sign.

The CQI report handling is independent and may coexist with other more long-term CQI report adjustments. An adjustment algorithm based on accumulated HARQ feedback statistics which aims to achieve a long-term BLER target is a prominent example.

Even though the above examples are related to downlink, the algorithms described above may also be on the reversed link.

In the context of uplink link adaptation, the power margin used for Enhanced Dedicated Channel (E-DCH) Transport Format Indicator (E-TFCI) selection as applicable for an adaptive offset solution is also considered. In this case, power (power backoff) is reserved based on channel variations to be able to decide the amount of power to be sent out.

Reducing the available power for Enhanced Dedicated Channel (E-DCH) Dedicated Physical Data Channel (E-DP-DCH), a corresponding expression for the Normalized Remaining Power Margin (NRPM) is obtained:

$$NRPM_j = \frac{PMax_j - P_{backoff}}{P_{DPCCH}} - \frac{\beta_c^2 + \beta_d^2 + \beta_{hs}^2 + \beta_{ec}^2}{\beta_c^2} \quad (12)$$

where $PMax_j$ is maximum power, $P_{backoff}$ is the backoff power and $P_{DPCCH}$ is the power of the DPDCH channel. $\beta_c$ is the power offset factor for DPCCH, $\beta_d$ is the power offset factor for DPDCH, $\beta_{hs}$ is the power offset factor for HS-DPCCH and $\beta_{ec}$ is the power offset factor for E-DPCCH.

By consider the term $P_{max}$ as a variable depending on the headroom $$P_{max} = P_{UE\,max\,power} - P_{backoff} \quad (13)$$

with $P_{backoff}$ as a function of e.g. the radio propagation environment as $P_{backoff} = P_{backoff}$(rms delay spread, # fingers, ...) a mechanism similar to downlink adaptive link adaptation for the uplink may be obtained as well.

In uplink, such approach may provide gain in the cases where the second communication node 105 is power limited, but not that power limited so it solely selects only the smallest transport block. The uplink approach is foreseen to provide minor gain for interference limited cases since the second communication node 105 should have, enough, power to play with and that the fast power control should assure that Signal to Interference Ratio (SIR) target is fulfilled.

The first communication node 115 may be a user equipment and the second communication node 105 may be a base station, or the first communication node 115 may be a base station and second communication node 105 may be a user equipment.

Figure 6:
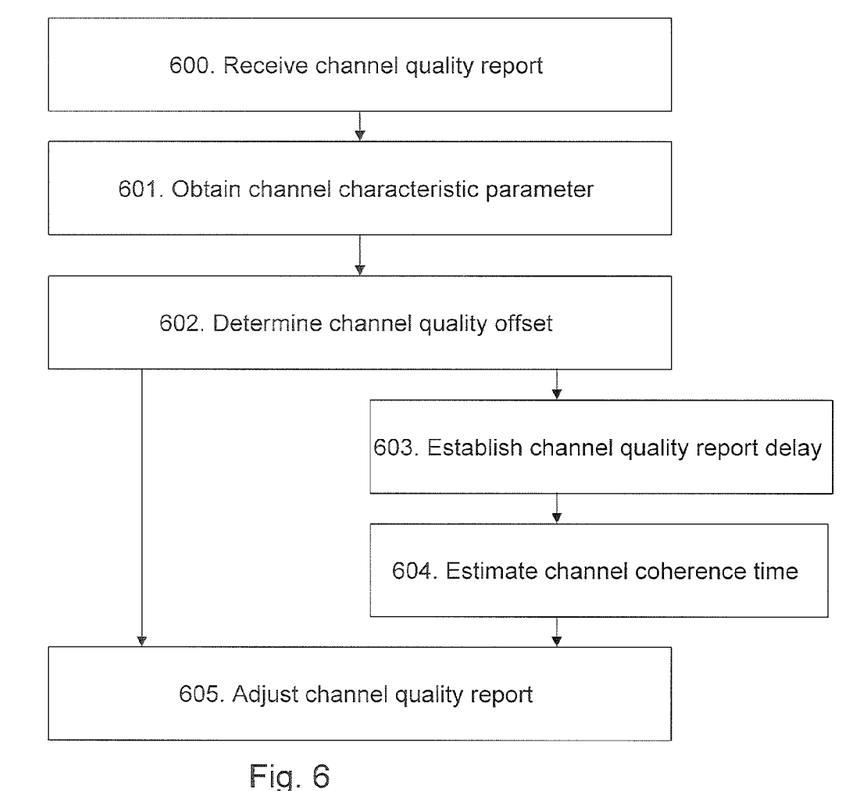
FIG. 6 is a flowchart illustrating a method for adjusting a channel quality report.

FIG. 6 is a flowchart illustrating an example of a method in a first communication node 115 for adjusting a channel quality report transmitted between the first communication node 115 and a second communication node 105. The first communication node 115 and the second communication node 105 are comprised in a wireless communication network 100, and they are adapted to communicate with each other via a radio link 110. The method comprises the following steps that may be preformed in any suitable order:

Step 600

The first communication node 115 receives a channel quality report from the second communication node 105. The channel quality report is established by the second communication node 105.

The channel quality report may be a channel quality indicator "CQI" value.

Step 601

The first communication node 115 obtains at least one channel characteristic parameter.

The at least one channel characteristic parameter may be one of a Doppler spread, channel coherence time, root means square delay spread, channel tap correlation, number of channel taps or channel impulse response.

Step 602

The first communication node 115 determines a channel quality offset based on the obtained channel characteristic parameter.

The channel quality offset may be based on $$CQI_{offset} = f(x) \cdot g(y)$$

wherein $CQI_{offset}$ is the channel quality offset, $f(x)$ is a weight function and $g(y)$ is a channel quality report parameter.

$f(x)$ may be a weight function based on the channel characteristic parameter, and further based on channel-coding rates or absolute level of a filtered channel quality report.

This step of determining the channel quality offset may be based on $$CQI_{offset}=f(T_{CQI_{rx}},T_c)\cdot(CQI_{filt}-CQI_{rx})$$

wherein $CQI_{offset}$ is the channel quality offset, $f(T_{CQI_{rx}}, T_c)$ is the weight function, $T_{CQI_{rx}}$ is a channel quality report delay, $T_c$ is a channel coherence time, $CQI_{filt}$ is an output from a filtering of previously received channel quality reports and $CQI_{rx}$ is a newly received channel quality report.

Step 603

This is an optional step. The first communication node 115 may establish a channel quality report delay, the delay being the time between establishment of the report in the second communication node 105 and adjustment of the report in the first communication node 115.

Step 604

This is an optional step. The first communication node 115 may estimate a channel coherence time.

Step 605

The first communication node 115 adjusts the channel quality report based on the channel quality offset.

The adjusted channel quality report may be used in link adaptation or channel-dependent scheduling.

Figure 7:
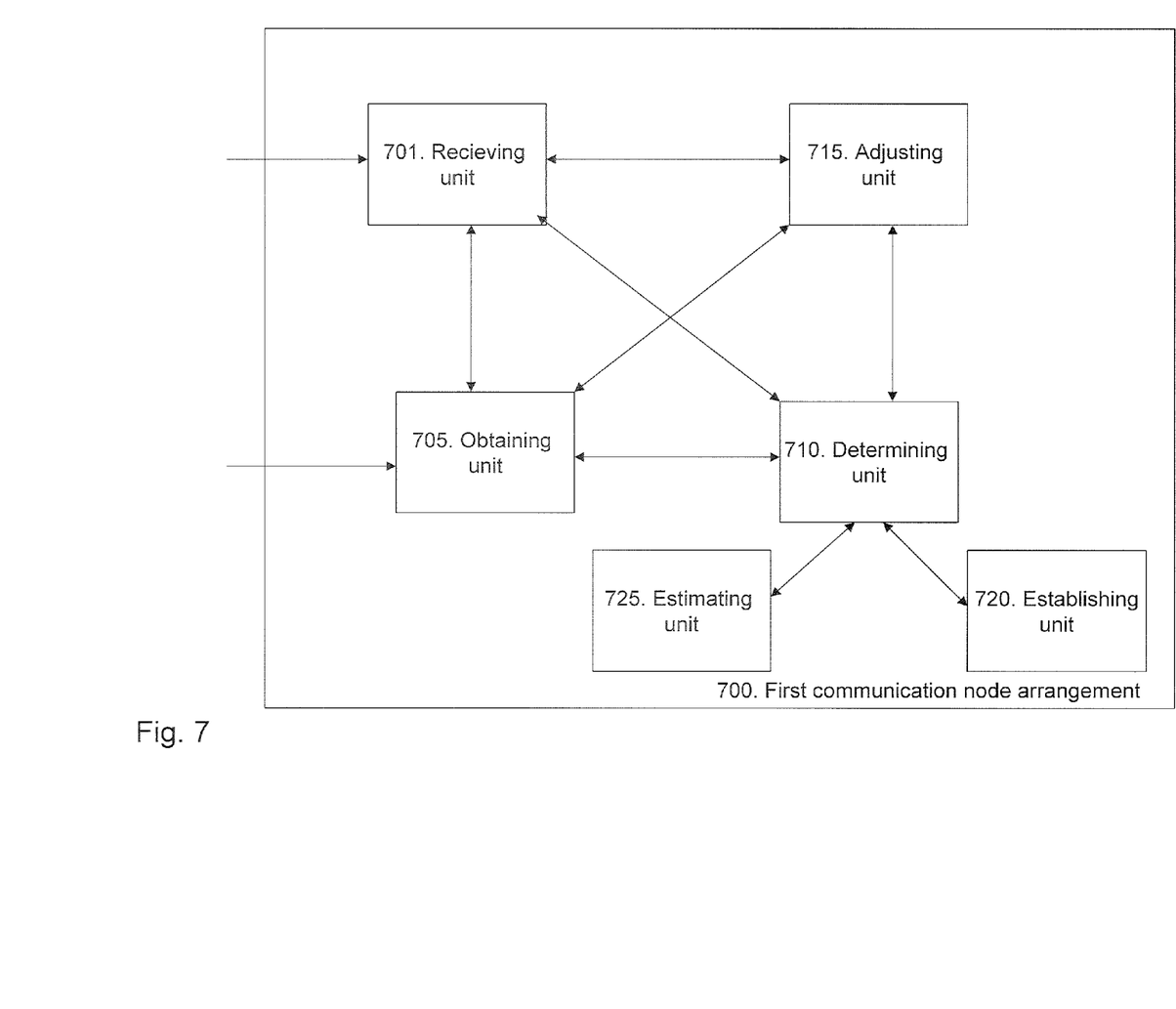
FIG. 7 is a schematic block diagram illustrating embodiments of a first communication node.

To perform the method steps shown in FIG. 6 for adjusting a channel quality report transmitted between the first communication node 115 and a second communication node 105, the first communication node 115 comprises a first communication node arrangement 700 as shown in FIG. 7. The first communication node 115 and the second communication node 105 are comprised in a wireless communication network 100, and are adapted to communicate with each other via a radio link 110.

The first communication node 115 may be a user equipment and the second communication node 105 may be a base station, or the first communication node 115 may be a base station and the second communication node 105 may be a user equipment.

The first communication node arrangement 700 comprises a receiving unit 701 arranged to receive a channel quality report from the second communication node 105. The channel quality report is established by the second communication node 105. It also comprises an obtaining unit 705 which is arranged to obtain at least one channel characteristic parameter. The at least one channel characteristic parameter is one of a Doppler spread, channel coherence time, RMS delay spread, channel tap correlation, number of channel taps or channel impulse response.

The arrangement 700 comprises a determining unit 710 arranged to determine a channel quality offset based on the obtained channel characteristic parameter. The channel quality offset is based on $$CQI_{offset}=f(x)\cdot g(y)$$

wherein $CQI_{offset}$ is the channel quality offset, $f(x)$ is a weight function and $g(y)$ is a channel quality report parameter. $f(x)$ is a weight function based on the channel characteristic parameter, and further based on channel-coding rates or absolute level of a filtered channel quality report.

The determining unit 710 is further arranged to determine the channel quality offset based on $$CQI_{offset}=f(T_{CQI_{rx}},T_c)\cdot(CQI_{filt}-CQI_{rx})$$

wherein $CQI_{offset}$ is the channel quality offset, $f(T_{CQI_{rx}}, T_c)$ is the weight function, $T_{CQI_{rx}}$ is a channel quality report delay, $T_c$ is a channel coherence time, $CQI_{filt}$ is an output from a filtering of previously received channel quality reports and $CQI_{rx}$ is a newly received channel quality report.

The arrangement also comprises an establishing unit 720 arranged to establish a channel quality report delay. The delay being the time between establishment of the report in the second communication node 105 and adjustment of the report in the first communication node 115. The arrangement comprises an estimating unit 725 arranged to estimate a channel coherence time The arrangement 700 further comprises an adjusting unit 715 which is arranged to adjust the channel quality report based on the channel quality offset. The channel quality report is a channel quality indicator "CQI" value. The adjusted channel quality report is used in link adaptation or scheduling decisions.

The present solution for adjustment of channel quality may be implemented through one or more processors, together with computer program code for performing the functions of the present solution. The program code mentioned above may also be provided as a computer program product, for instance in the form of a data carrier carrying computer program code for performing the present solution when being loaded into the first communication node 115 or second communication node 105. One such carrier may be in the form of a computer readable medium such as a CD ROM disc. It is however feasible with other data carriers such as a memory stick. The computer program code may furthermore be provided as pure program code on a server and downloaded to the first communication node 115 or second communication node 105 remotely.

The steps of the method are not bound to the order, but may be performed in an arbitrary order.

The detailed technical description is exemplified here with a WCDMA system employing HSDPA on a single carrier. However, this should not be seen as a limitation when the invention may be applicable in other wireless communication systems using reported channel qualities for link adaptation and channel-dependent scheduling.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a first communication node for adjusting a channel quality report transmitted between the first communication node and a second communication node, wherein the first communication node and the second communication node are in a wireless communication network and are configured to communicate with each other via a radio link, the method comprising:

receiving, from the second communication node, a channel quality report established by the second communication node;

obtaining, at the first communication node, at least one channel characteristic parameter responsive to receiving the channel quality report;

determining, at the first communication node, a channel quality offset based on the obtained channel characteristic parameter, wherein determining a channel quality offset comprises:

establishing a channel quality report delay, the delay being the time between establishment of the report in the second communication node and adjustment of the report in the first communication node; and estimating a channel coherence time; and adjusting, at the first communication node, the channel quality report based on the channel quality offset.

2. The method of claim 1 wherein the channel quality offset is based on $$CQI_{offset}=f(x) \cdot g(y),$$

where:
CQI$_{offset}$ is the channel quality offset;
$f(x)$ is a weight function; and
$g(y)$ is a channel quality report parameter.

3. The method of claim 2 wherein $f(x)$ comprises a weight function based on the channel characteristic parameter, and on channel-coding rates or absolute level of a filtered channel quality report.

4. The method of claim 1 wherein the step of determining the channel quality offset is based on $$CQI_{offset}=f(T_{CQI_{rx}},T_c) \cdot (CQI_{filt}-CQI_{rx}),$$

where:
CQI$_{offset}$ is the channel quality offset;
$f(T_{CQI_{rx}},T_c)$ is the weight function;
$T_{CQI_{rx}}$ is a channel quality report delay;
$T_C$ is a channel coherence time;
CQI$_{filt}$ is an output from a filtering of previously received channel quality reports; and
CQI$_{rx}$ is a newly received channel quality report.

5. The method of claim 1 wherein the channel quality report comprises a channel quality indicator (CQI) value.

6. The method of claim 1 wherein the at least one channel characteristic parameter is one of a Doppler spread, a channel coherence time, a root means square delay spread, a channel tap correlation, a number of channel taps, and a channel impulse response.

7. The method of claim 1 further comprising using the channel quality report after said adjusting in link adaptation or scheduling decisions.

8. The method of claim 1:
wherein the first communication node comprises a user equipment and the second communication node comprises a base station; or
wherein the first communication node comprises a base station and the second communication node comprises a user equipment.

9. An arrangement in a first communication node for adjusting a channel quality report transmitted between the first communication node and a second communication node, wherein the first communication node and the second communication node are in a wireless communication network and configured to communicate with each other via a radio link, the first communication node comprising:
a receiver configured to receive, from the second communication node, a channel quality report established by the second communication node; and
a processing circuit configured to:
obtain at least one channel characteristic parameter responsive to receiving the channel quality report;
determine a channel quality offset based on the obtained channel characteristic parameter, wherein to determine the channel quality offset, the processing circuit is configured to:
establish a channel quality report delay, the delay comprising a time between the establishment of the report in the second communication node and the adjustment of the report in the first communication node; and
estimate a channel coherence time; and
adjust the channel quality report based on the channel quality offset.

10. The arrangement of claim 9 wherein the channel quality offset is based on $$CQI_{offset}=f(x) \cdot g(y),$$

where:
CQI$_{offset}$ is the channel quality offset;
$f(x)$ is a weight function; and
$g(y)$ is a channel quality report parameter.

11. The arrangement of claim 10 wherein $f(x)$ comprises a weight function based on the channel characteristic parameter, and on channel-coding rates or absolute level of a filtered channel quality report.

12. The arrangement of claim 9 wherein the processing circuit is further configured to:
determine the channel quality offset based on $$CQI_{offset}=f(T_{CQI_{rx}},T_c) \cdot (CQI_{filt}-CQI_{rx}),$$

where:
CQI$_{offset}$ is the channel quality offset;
$f(T_{CQI_{rx}},T_c)$ is the weight function;
$T_{CQI_{rx}}$ is a channel quality report delay;
$T_C$ is a channel coherence time;
CQI$_{filt}$ is an output from a filtering of previously received channel quality reports; and
CQI$_{rx}$ is a newly received channel quality report.

13. The arrangement of claim 9 wherein the channel quality report comprises a channel quality indicator (CQI) value.

14. The arrangement of claim 9 wherein the at least one channel characteristic parameter is one of a Doppler spread, a channel coherence time, a root means square delay spread, a channel tap correlation, a number of channel taps, and a channel impulse response.

15. The arrangement of claim 9 wherein the processing circuit is further configured to adjust the channel quality report based on the channel quality offset so as to be suitable for use in link adaptation or scheduling decisions.

16. The arrangement of claim 9:
wherein the first communication node comprises a user equipment and the second communication node comprises a base station; or
wherein the first communication node comprises a base station and the second communication node comprises a user equipment.

* * * * *